United States Patent
Peacock et al.

(10) Patent No.: US 9,619,529 B2
(45) Date of Patent: Apr. 11, 2017

(54) METHOD AND SYSTEM OF VISUALIZING RENDERING DATA

(71) Applicant: ADOBE SYSTEMS INCORPORATED, San Jose, CA (US)

(72) Inventors: Gavin Murray Peacock, Walnut Creek, CA (US); Seth Walker, Minneapolis, MN (US); Sedat Akkus, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 430 days.

(21) Appl. No.: 13/830,566

(22) Filed: Mar. 14, 2013

(65) Prior Publication Data

US 2014/0282176 A1 Sep. 18, 2014

(51) Int. Cl.
*G06F 3/0484* (2013.01)
*G06F 17/30* (2006.01)

(52) U.S. Cl.
CPC .............. *G06F 17/30554* (2013.01)

(58) Field of Classification Search
CPC .................. G06F 3/0484; G06F 17/30554
See application file for complete search history.

(56) References Cited

U.S. PATENT DOCUMENTS

| | | | | |
|---|---|---|---|---|
| 2010/0020069 A1* | 1/2010 | Elmieh | ................... | G06T 15/00 345/419 |
| 2012/0246170 A1* | 9/2012 | Iantorno | ................... | G06F 8/77 707/748 |
| 2013/0013248 A1* | 1/2013 | Brugler | ............... | G06F 11/3082 702/130 |
| 2013/0067378 A1* | 3/2013 | Au | .......................... | G06F 11/32 715/771 |
| 2013/0208785 A1* | 8/2013 | Abdo | ................... | H04N 19/176 375/240.02 |

* cited by examiner

*Primary Examiner* — Mark A Radtke
*Assistant Examiner* — Seth A Silverman
(74) *Attorney, Agent, or Firm* — Shook, Hardy & Bacon, L.L.P.

(57) ABSTRACT

Method and systems of visually depicting rendering data are provided. rendering data pertaining to rendering, by a display engine, of display objects in a display zone for a selected frame is accessed. Then, for the selected frame, a heat map is generated based on rendering data corresponding to the selected frame, the heat map containing a plurality of heat objects, each heat object corresponding in proportional size and location to a different display object in the display zone, each heat object displayed in a color having an intensity proportional to an amount of computational resources taken by the display engine to render the corresponding display object. Finally, the heat map is displayed.

20 Claims, 12 Drawing Sheets

METHOD AND SYSTEM OF VISUALIZING RENDERING DATA

FIELD

The present disclosure relates generally to visualizing rendering data.

BACKGROUND

A number of different systems produce large volumes of data that can be more easily understood and managed by visual analysis. Analysis of this data can typically be handled in a number of different ways. One example is to use software known as a profiler. A software profiler uses a form of dynamic program analysis that measures, for example, the memory or time complexity of a software product, the usage of particular instructions, the frequency and duration of function calls, etc. This aids the designer of the software product in the optimization of the software product.

One common use for profilers is to aid in the analysis of rendering data. Rendering data is data collected during rendering of visual objects (e.g., images, vectors, colors, etc.) on a computer display. Rendering data may derive from, for example, a user-scriptable engine. Examples of user-scriptable engines include, but are not limited to, ADOBE FLASH PLAYER™ from Adobe Systems, Inc. of San Jose, Calif. as well as web browsers (such as Chrome™ from Google, Inc. of Mountain View, Calif.) operating hypertext markup language 5 (HTML 5). This rendering data often contains data related to visual components and elements, but profilers currently lack the ability to effectively and intuitively visualize such rendering data.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Disclosed herein is a method and system of visualizing rendering data in a manner that allows a user to easily identify areas that are problematic and/or can be improved. This may be accomplished via a number of different mechanisms. First, all rendering passes may be displayed in a list with the time spent on each rendering pass and a thumbnail that depicts the areas updated on the screen. A rendering pass often corresponds to a screen update and a few prior steps that lead to this screen update such as calculating a dirty region or rendering regions, which are used to calculate the pixels that will be drawn on the screen. Second, each visual component type may be represented by a different color in multiple places in the user interface. Third, each rendering related operation may be listed in a tree in the order in which they occur, and each visual component can be shown in the tree by preserving a parent/child hierarchy with additional details about the visual component. Fourth, heat maps and region maps may be used to indicate areas of rendering, Fifth, bidirectional navigation may be provided between the visual representation of the rendering data and the underlying data in the user interface. These five mechanisms may be mixed and matched, such that any number or combination of these mechanisms may be utilized to improve user experience.

Figure 1:
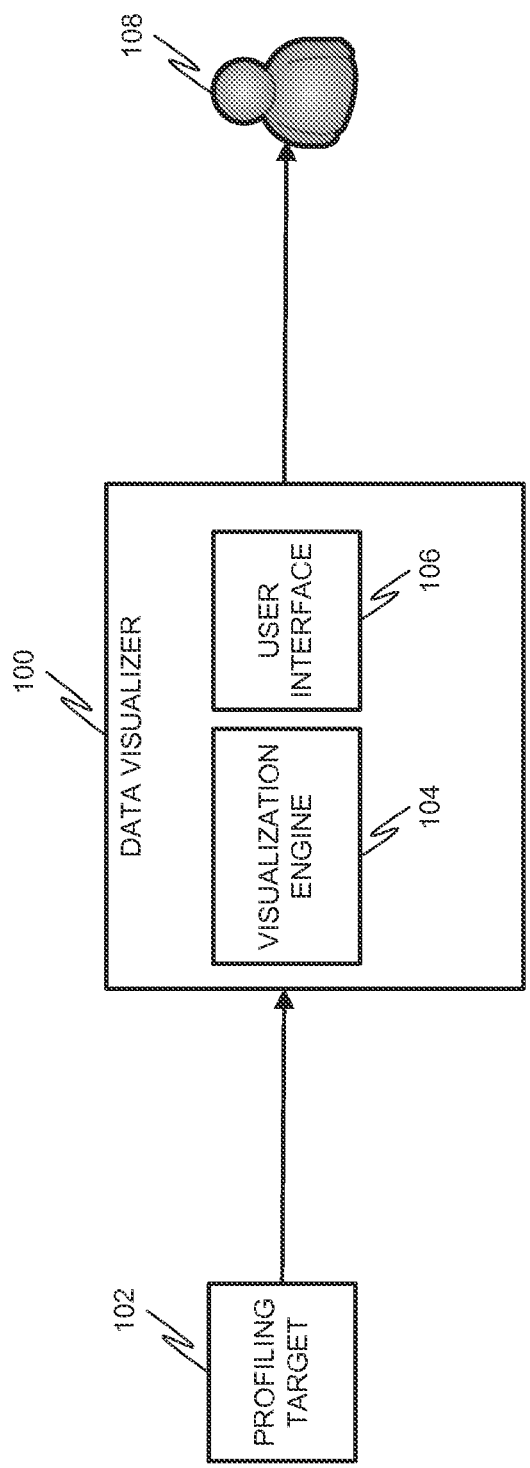
FIG. 1 is a block diagram illustrating a profiler in accordance with an example embodiment.

The term "data visualizer" as used throughout this disclosure shall be interpreted broadly to mean any tool used to visually analyze data. FIG. 1 is a block diagram illustrating a data visualizer in accordance with an example embodiment. The data visualizer 100 receives input data from a profiling target 102. The profiling target 102 may, in some example embodiments, also contain a profiler that tracks certain information in the profiling target 102 and creates hierarchical data to output as the input data to the data visualizer 100. The data visualizer 100 may include a visualization engine 104 and a user interface 106. The visualization engine 104 acts to organize the input data and present the input data in a meaningful way to a user 108 via the user interface.

In some example embodiments, the data visualizer 100 in question may interface with a profiler designed to aid programmers or other users in analyzing and optimizing software products. One such profiler is ADOBE SCOUT™ from Adobe Systems, Inc. of San Jose, Calif. ADOBE SCOUT™ is a profiling tool that allows a user to easily identify areas of optimization of created content, such as content compatible with ADOBE FLASH PLAYER™ of Adobe Systems, Inc. of San Jose, Calif.

In some example embodiments, the input data 102 may be received from a user-scriptable engine. Examples of user-scriptable engines include, but are not limited to, ADOBE FLASH PLAYER™ as well as web browsers (such as Chrome™ from Google, Inc. of Mountain View, Calif.) operating hypertext markup language 5 (HTML 5).

ADOBE FLASH PLAYER™ is software used to view multimedia. It typically runs from a web browser or mobile device, allowing multimedia files created for the software to be viewed on a number of different platforms without the need to modify the multimedia files. The multimedia files are stored in a format known as an SWF file. The SWF files contain static data, such as images, and dynamic data, such as scripts. The scripts are usually written in a language known as ActionScript, which are executed at certain points in time to allow for modification of screen objects and to allow for interactivity. The various activities that are executed in ADOBE FLASH PLAYER™ then generally fall into the category of either native commands or user-defined commands. The native commands are commands executing native functionality of the user-scriptable engine, typically written in C++ code, while user-defined commands are, as described above, typically written in ActionScript.

Many SWF files are used to define applications, especially games, that perform a great deal of graphical animation. The basic principle is to redraw the screen at a certain frequency, for example 60 times a second, so that it appears as a smooth animation. Each of these redraws is known as a frame, and the frequency of refreshing is known as the framerate, which can be defined in each SWF file. In some instances, each frame may contain multiple rendering passes to render different elements of the frame.

Within a frame, ADOBE FLASH PLAYER™ has many different activities to perform. This might include redrawing part of the screen, starting a new file download, mouse, keyboard, or other events, for example. Thus, one common analysis of an SWF file application is to determine whether the activities that need to be performed for a given frame can actually be performed in the amount of time allowed for that frame, given the framerate. For example, if the framerate is 60 times a second, then the activities for a given frame must be able to be performed in ⅟60 of a second, or else the ultimate animation may be appear choppy or otherwise hindered. A profiling tool such as ADOBE SCOUT™ can be used to identify frames that fail this metric and allow the user to easily identify which particular activities are causing the problem. Thus, an application developer may notice that animation appears choppy at a certain point in the application, can use ADOBE SCOUT™ to identify the exact frames that are at issue, and then further analyze which of the activities performed in those frames are at issue.

Figure 2:
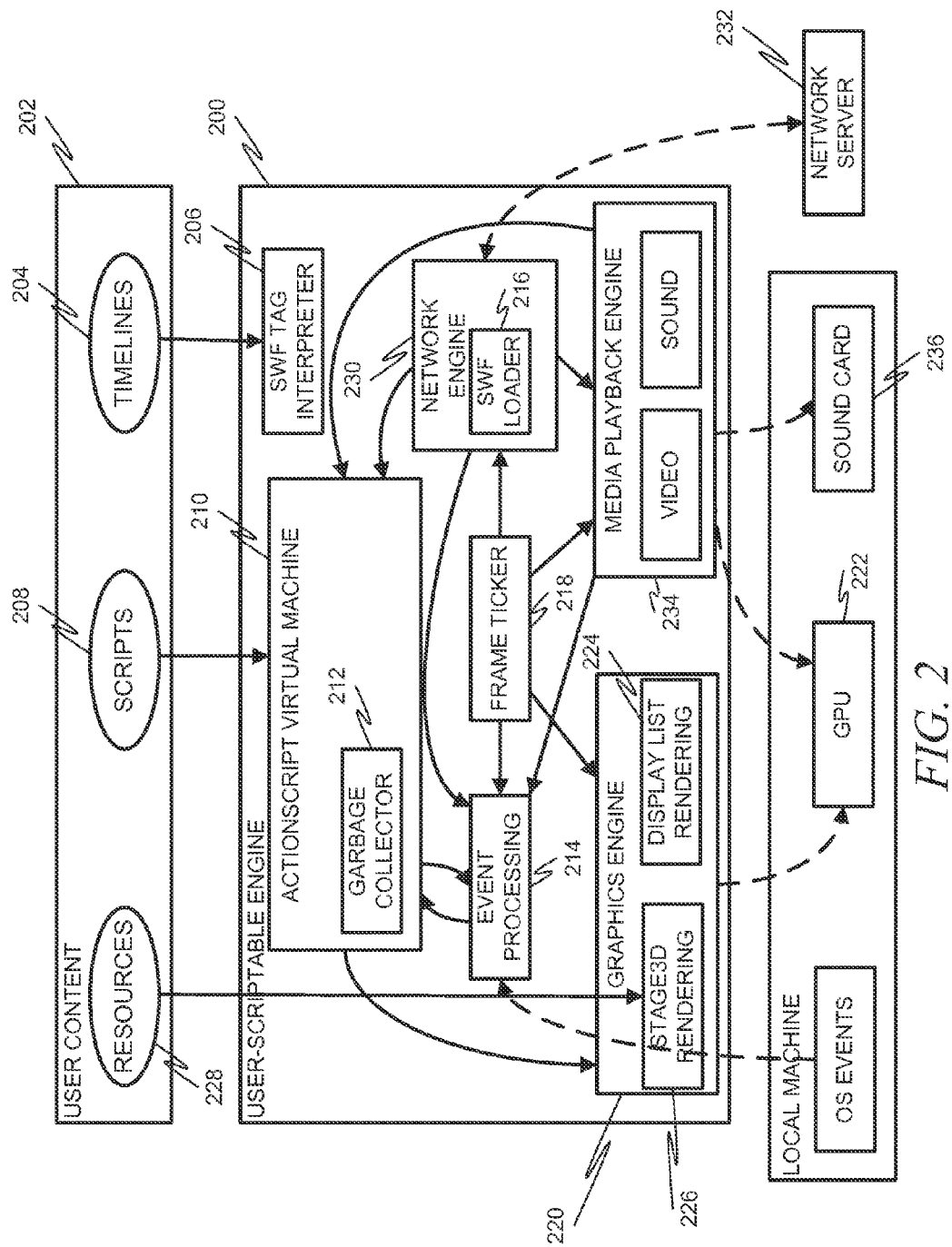
FIG. 2 is a block diagram illustrating a user-scriptable engine, such as ADOBE FLASH PLAYER™.

FIG. 2 is a block diagram illustrating a user-scriptable engine, such as ADOBE FLASH PLAYER™. The user-scriptable engine 200 may receive user content 202. The user content 202 may include timelines 204, which may be interpreted by an SWF tag interpreter 206 on the user-scriptable engine 200. The user content 202 may also include scripts 208, which may be executed by an Action-Script virtual machine 210 on the user-scriptable engine 200. The ActionScript virtual machine 210 implements certain core features of the ActionScript, including garbage collection (by garbage collector 212) and exceptions, as well as acting as a bridge between the scripts 208 and the user-scriptable engine 200.

Event handlers (implemented in the event processing 214) are functions that are registered by the programmer to get called when a specific event happens. Common events are navigation events (e.g., keyboard presses, mouse events, touch and gesture events, etc.) and window events (e.g., resize, full screen, etc.).

ActionScript can take care of the allocation and freeing of memory. The garbage collector 212 is then used to scan for any objects that are no longer being referenced, and free up the memory they are using. A large amount of garbage collection means that there are too many objects being created, something the programmer may wish to learn about and address.

When the user-scriptable engine 200 starts a new user-scriptable engine instance, it first has to download the main SWF, parse it, and load it into memory before it can start to execute it. This is performed by the SWF loader 216.

A frame ticker 218 is a heartbeat that, pulses whenever it is time for a new frame to start. At the start of each frame, it executes any timeline tag, invokes any frame scripts on the timeline, and dispatches a few key ActionScript events.

A graphics engine 220 may perform the acts of rendering the actual visuals of the frames, oftentimes utilizing a graphics processing unit (GPU) Display list rendering 224 is the classical approach to rendering in a user-scriptable engine 200. Here, a blank canvas is provided known as a stage and the system draws to it and attaches and positions graphical entities known as display objects. Display objects may include, for example, vector art, bitmaps, text, etc., and they can be nested hierarchically to build a complicated scene. There are a number of steps that can occur when rendering a frame including, for example, calculating dirty regions (ones that include objects that have moved and need to be redrawn), rendering dirty regions, and copying to screen.

Another type of rendering that may be supported by the graphics engine 220 may be Stage3D rendering 226. The basic structure of a Stage3D rendering cycle is to first set up a state of the GPU 222 (e.g., uploading textures, meshes, and shaders) and second to issue a number of draw calls that tell the GPU 222 to render batches of triangles to the target buffer. The finished product can then be presented to the screen.

As the graphics engine 220 operates, it consumes resources 228. These resources 228 may include bitmaps, images, meshes, shaders, etc.

A network engine 230, which may contain the previously mentioned SWF loader 216, may also be used to communicate with a network server 232 to provide streaming or other network services.

Video or sound may be run in a media playback engine 234, which can interface with both the GPU 222 and a sound card 236.

There are a number of different types of items in the user-scriptable engine 200 that can be monitored including, for example, CPU time, memory usage, GPU usage, function calls, etc. Generally this information may be classified into either instrumented data or sampled data. Instrumented data is data that is captured via additional program code, or hooks that an external process can attach to, embedded within the functions. In the case of the ADOBE FLASH PLAYER™, these functions are written in C++ Native function calls within the user-scriptable engine 200, for example, and could have additional lines of code added to them which act to record data when the functions are executed. Lightweight instrumentation can be used in such instances, to reduce the overhead that can be attributed to the instrumentation itself. This instrumented data can be valuable, but it is typically implemented by a developer of a user-scriptable engine 200, and as such the functions that are chosen to be instrumented cannot be easily modified. Sampled data, on the other hand, is interpreted dynamically at runtime. In the case of the ADOBE FLASH PLAYER™, these sampled functions are written in ActionScript.

Regardless of the source of the data, whether from a user-scriptable engine 200 having instrumented data and sampled data, or from a native application having only instrumented data, each piece of data may be assigned a name. In an example embodiment, these names may be assigned to categories, which may be nested, or hierarchical in nature. For example, a particular text rendering function may be assigned to leaf category, such as "text rendering", and is therefore implicitly also a member of any parent categories, such as "rendering."

Generally there are two types of categories. The first is fixed categories. These are categories of functions that are commonly used in the user-scriptable engine or application. This might include, for example, "rendering," "script execution," "garbage collection," etc. These are categories of data that commonly occur regardless of the content and, in an example embodiment, may be hard-coded into the profiler along with the names that map to the fixed categories. For example, the profiler designer may decide that all functions that start with ".rend" get assigned to the "rendering" category. in an example embodiment, filtering may also take place, especially for the less common categories, such that if no data winds up being assigned to the category, it may be filtered out (e.g., hidden from the user).

The second type of category is dynamic categories. Dynamic categories are those that depend on data that isn't available until runtime. Dynamic categories can be thought of as belonging to an infinite set (such as the set of all words). Since the dynamic categories are infinite, they cannot be created all statically and have data assigned to them. Rather, the categories are created as new data is assigned.

Figure 3:
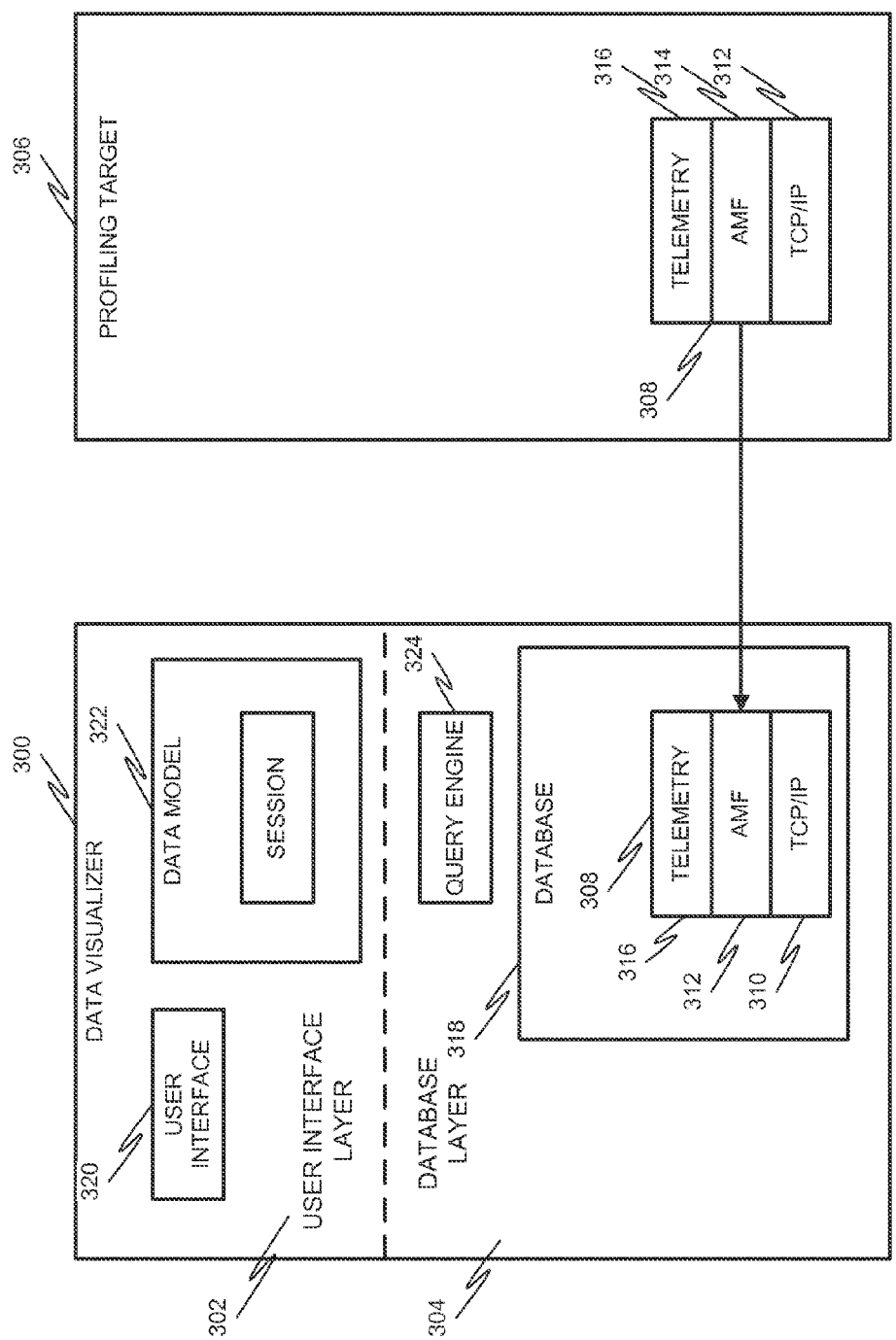
FIG. 3 is a block diagram illustrating a data visualizer in accordance with an example embodiment.

FIG. 3 is a block diagram illustrating a data visualizer 300 in accordance with an example embodiment. The data visualizer 300 may include a user interface layer 302 and a database layer 304. The user interface layer 302 may be constructed in a lightweight multi-paradigm programming language designed as a scripting language having extensible semantics, such as Lua. This is because the user interface layer 302 doesn't need to be fast, as it doesn't deal with as much data. The database layer 304 may be constructed in an object-oriented programming language, such as C++. This is because speed is important in the database layer 304.

The database layer 304 may interact with a profiling target 306 to receive data 308 from the profiling target 306. The profiling target 306 may be any system to be monitored by the profiler 300, but in an example embodiment may specifically be a user-scriptable engine, such as the user-scriptable engine 200 described in FIG. 2 and the corresponding text. The data 308 may contain multiple layers. At the lowest layer, a networking protocol 310, such as TCP/IP, may be used to allow the data to be transferred via any number of different physical or wireless transmission mediums, such as Ethernet, IEEE 802.11 standards (Wi-Fi), Bluetooth, etc. The next layer 312 may be a format used to serialize objects. An example of such a format is the Action Message Format (AMF), which is a binary format used to serialize object graphs such as ActionScript objects and XML, or to send messages between user-scriptable engine clients and remote services. Another example is binary JavaScript Object Notation (JSON). At the top layer is telemetry 314, which is the data about the operation of the profiling target 306 that is being monitored. As described earlier, this telemetry 314 is a protocol layer having specific forms of data that are used for transmitting the data. The data may include instrumented data and/or sampled data, and may be hierarchical in nature. It should be noted that while telemetry 314 is depicted as a single object, it typically is a stream of data. It should be noted that in some embodiments this stream may be sent as different Transport Control Protocol/internet Protocol (TCP/IP) streams, where one stream comes from instrumentation and another stream comes from sampling.

A database 318 may receive and store the data 308 organized into sessions. A session is a discrete period of time for a specific piece content and during which monitoring occurs on the specific piece of content (e.g., a specific SWF being examined). A user may define the length of a session by, for example, selecting a recording button of the data visualizer 300 to begin recording telemetry 314 and then selecting a stop button to stop recording the telemetry 314. The sessions can each store data from multiple streams.

The user interface layer 302 may include a user interface 320 and a data model 322. The data model 322 contains astute for each session, which contains a high-level view of the underlying data 308 as needed. When the user interface 318 receives instructions to navigate through the data 308, such as selecting a particular frame, or altering a frame selection, the instructions are passed through the data model 320 which sends a request to a query engine 324 in the database layer 304. The query engine 324 then generates one or more database queries based on the request, and send them to the database 318, which returns the queried data to the data model 320, which can then arrange for the display of the new data in the user interface 318.

A visual component is a structure that represents an area of a display. Visual components are typically defined for each rendering mechanism. For example, FLASH PLAYER™ display list rendering contains regions, display objects, and surfaces, all of which are considered visual components. Regions are bounding rectangles containing pixels on the display that need to be redrawn. These regions are determined based on modified objects and objects related to the modified objects (e.g., objects that need to be redrawn due to the modified objects). Display objects are pieces of items to be rendered on a display, such as vector content, bitmap, text, etc. Surfaces are bitmap images that are cached using one or more display objects in order to avoid recalculation of the pixels for those objects each time they need to be drawn. This provides a significant performance gain whenever a cache can be used for this purpose, however surfaces can also be tricky because invalidating the cache and recalculating the pixels values is more expensive than simply calculating pixels each time they need to be drawn.

When a user profiles visual content such as rendering data, they typically start with analyzing how much time an application (such as an application designed by the user) spends specifically on rendering. After this initial step, there are several things related to rendering that would be helpful to see. These include: (1) how many screen updates happened in each frame and time spent on each of the rendering passes; (2) a breakdown of the time spent on rendering, which areas of the screen get updated every frame and how much time is spent on each area; (3) which visual components are redrawn for each frame, type of visual components (cached vs. uncached); (4) unique information about the visual components, such as symbol name and instance name, in order to differentiate the visual components from one another; (5) which visual components were modified and caused some part of the screen to be redrawn for each frame; and (6) which areas of the screen take the most time comparing to other areas without needing to analyze every visual component. Knowing all this information allows a user to easily identify problematic areas and find potential improvements in the application. This allows users to answer questions such as (1) is there any rendering related operation that is not supposed to be performed or not supposed to take so much time? (2) is there any area that gets rendered that is not supposed to be rendered? (3) is there a visual component that was modified in a frame that was not supposed to be modified? (4) is there a visual component or group of components that are not cached by that should be cached and (5) is there a visual component or group of components that are cached by should not be cached because the cache gets invalidated often?

A number of screen captures illustrating various features of example embodiments will now be presented. It should be noted that the discussions of these screen captures will discuss various colors(visual identifications) of elements of the screen captures. Due to the limitations of patent drawings, the colors of elements have been depicted as different patterns, such as hash lines. A legend is provided on each figure to indicate the color that each particular pattern corresponds to. Additionally, many of the textual elements of the screen captures are also intended to have color. To the extent a pattern is depicted behind or on top of text, this is intended to imply that the text itself is presented in the corresponding color, and not intended to imply that a rectangle or other shape containing the color is to be presented behind the text.

Figure 4:
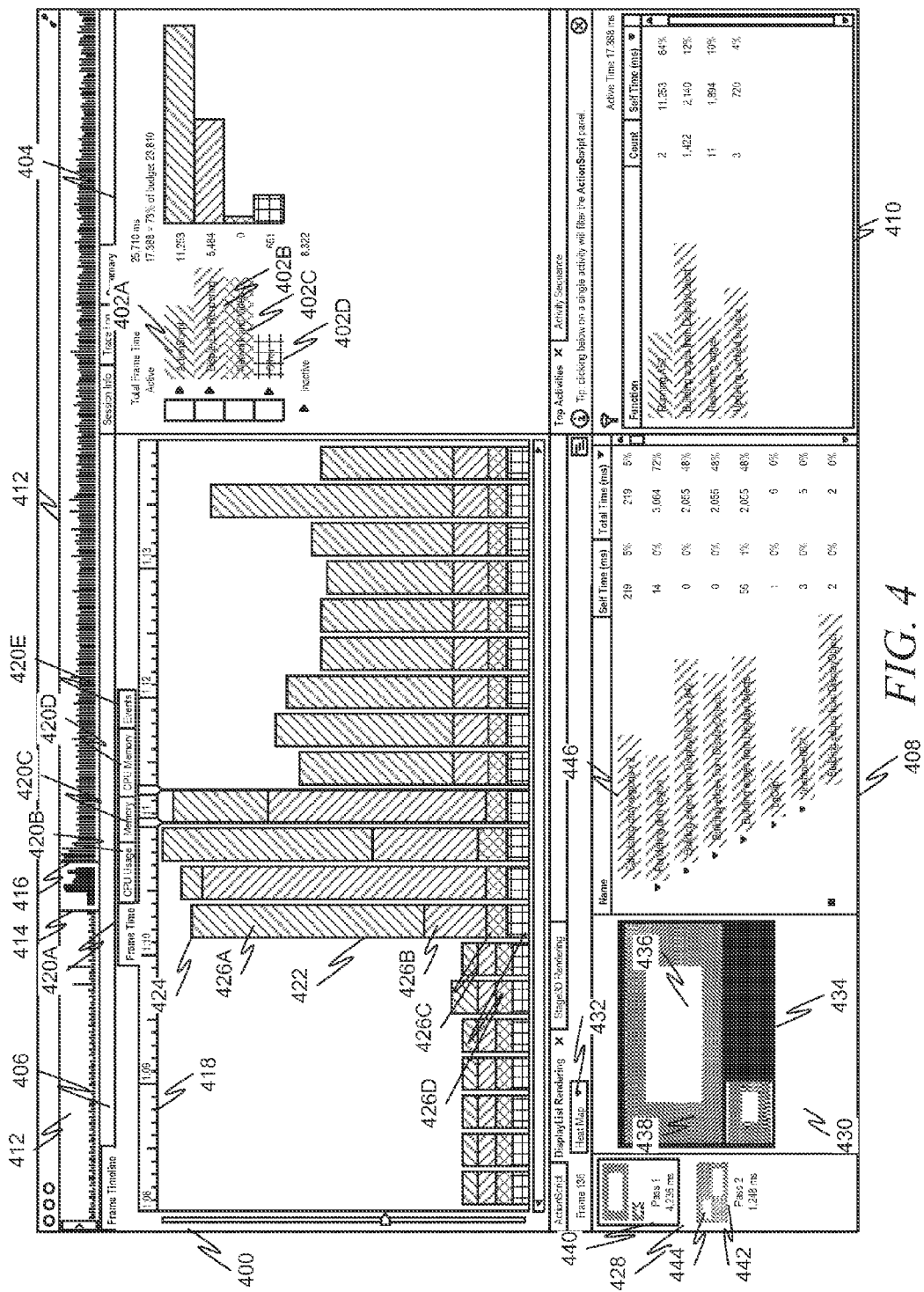
FIG. 4 is a screen capture illustrating a user interface, in accordance with an example embodiment, used to visualize rendering data.

FIG. 4 is a screen capture illustrating a user interface 400, in accordance with an example embodiment, used to visualize rendering data. In this example embodiment, each category 402A-402D of data at a particular level in the hierarchy is depicted in a different color. This color is then carried throughout multiple viewing regions 404, 406, 408, 410, such that items related to a particular category are depicted in a consistent color throughout the entire user interface 400.

The user interface 400 also includes a temporal selection region 412. The temporal selection region 412 allows a user to select a portion of recorded data by, for example, defining starting 414 and ending 416 points. The data between the starting 414 and ending 416 points is then reflected in the various other viewing regions 404, 406, 408, 410, 412 of the user interface. This data represents data collected in multiple selected frames between the starting 414 and ending 416 points. Viewing region 404 depicts a summary view of the data.

Viewing region 406 is a graphical representation of the data viewed temporally, specifically a frame timeline. Thus, a time axis 418 is provided, and the data can be organized in slices of time. Note, this may display time as a frame number of as an elapsed time since the beginning of the session. As with viewing region 404, the user may select different data measurements to depict, including frame time 420A, CPU 420B, memory 420C, GPU memory 420D, and events 420E. Notably, each time slice, such as time slice 422 graphically depicts a total measurement across all categories (depicted as the total size of the bar line 424), along with visually breaking down this total measurement by category. In time slice 422, for example, one can see the total time spent rendering frames in this time slice by viewing the total size of the bar line 424, but one can also see how much of this time was due to individual categories by viewing the individual segments 426A, 426B, 426C, 426D of the bar line 424.

Viewing region 408 depicts a displaylist rendering panel, which visually presents information about a particular frame's rendering. The particular frame depicted may be selected by the user selecting a particular time slice, such as time slice 422 in viewing region 406. The displaylist rendering panel may include a thumbnail portion 428 and a stage view portion 430. The stage view portion 430 may include a drop-down menu 432 that allows the user to select between depicting a heat map, a region view, or both. Here, the user has selected heat map. A heat map 434 is then presented in the stage view portion 430. This heat map 434 displays rectangles being rendered on a display. In this frame, two rectangles are rendered, including rectangle 436 and rectangle 438. These rectangles 436, 438 are shaded with an intensity (brightness) that is proportional to the amount of time that it takes to render. Thus, rectangle 436 is depicted as having a higher intensity (being more white) than rectangle 438. This means that rectangle 436 takes more time to render. A user is then very easily able to determine "hot spots" in the frame, namely those rectangles that are taking abnormally or unusually long to render.

Additionally, some frames require multiple passes of rendering in order to complete. In such cases, a user may be presented with thumbnails 440, 442 in thumbnail portion 428, depicting smaller representations of the heat map for the corresponding pass. Here, the heat map 434 depicts selected pass 1, represented by thumbnail 440, but the user can easily see that a hot spot 444 is present in pass 2 merely by examining thumbnail 442. The user could then select this thumbnail for the rendering pass two 446 in order to make the heat map 434 display in full size for pass 2.

A breakdown tree view 446 is also presented in viewing region 408. The breakdown tree view 446 depicts details of the rendering functions in the selected rendering pass. Notably, the thumbnail portion 428, stage view portion 430, and breakdown tree view 446 are all interactively connected, such that selecting a detail in one of the portions/views updates the other portions/views. The ability to click on an area to highlight in the breakdown tree view 446 and have that are immediately reflected in the other views/portions helps users quickly find the visual component that is associated with the selected area. In cases where there is more than one visual component that can make up a selected area, the visual components may be navigated through when the user clicks on the same area multiple times.

Figure 5:
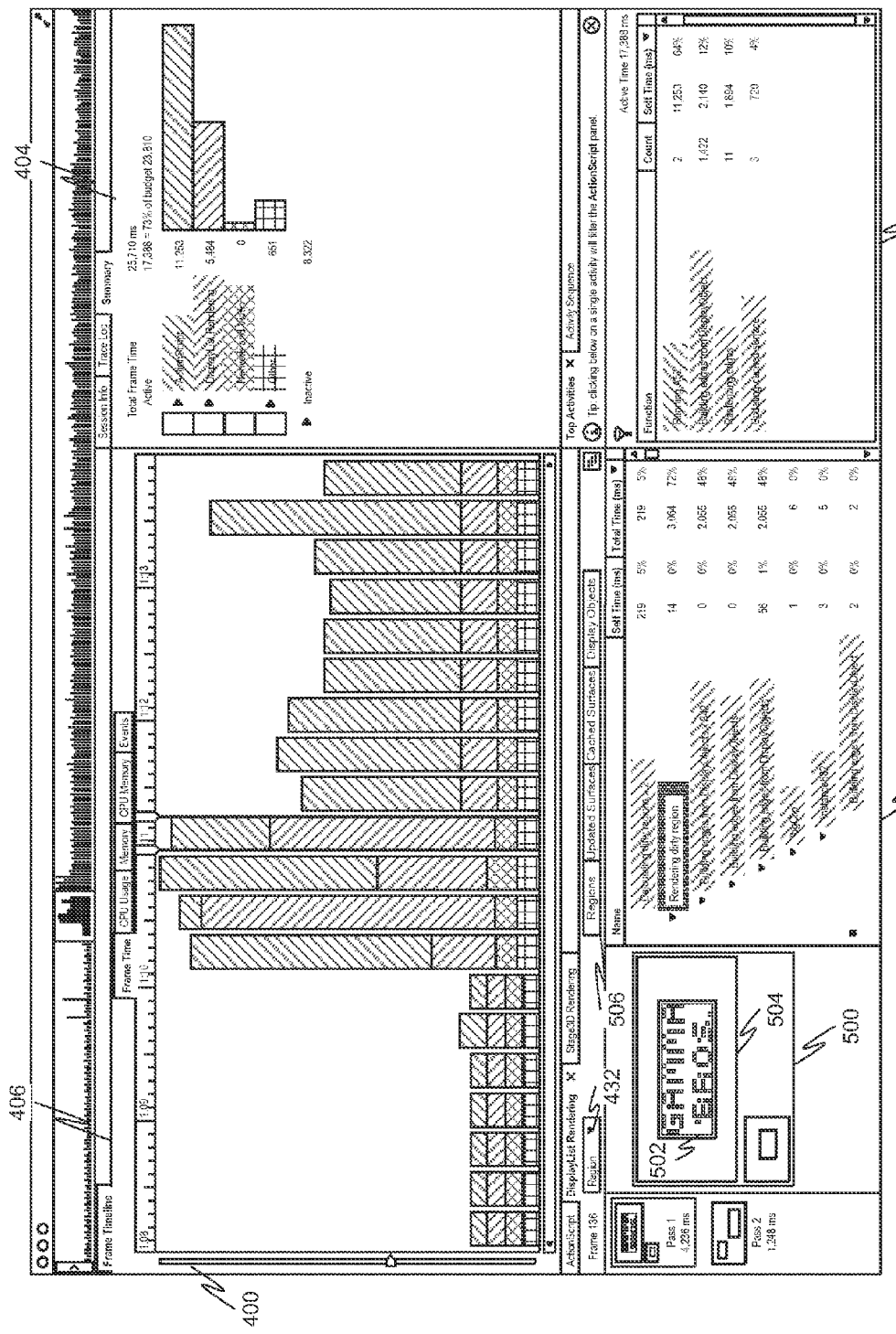
FIG. 5 is a screen capture illustrating the user interface, in accordance with an example embodiment, used to visualize rendering data, at another time.

FIG. 5 is a screen capture illustrating the user interface 400, in accordance with an example embodiment, used to visualize rendering data, at another time. Here, the user has selected region from drop down menu 434 in viewing region 408. This causes the display of a region view 500 for the selected frame. Region view 500 presents boundaries of visual components that were rendered in the selected rendering pass. Each component type is represented with a different color in order to distinguish between different visual types, such as which surfaces were cached or updated. While this color cannot be viewed in this figure due to the limitations of patent figures, region 502 is presented in one color (visual identification) while region 504 is depicted in another color. As with FIG. 4, selecting on any area highlights the entry associated with it in the breakdown tree view 446. A bar 506 lists all types of components and allows users to hide/show each component type. Notably, the colors are consistent through the user interface 400, thus areas in bar 506 are depicted in the same color corresponding areas in the region view 500, for example.

Figure 6:
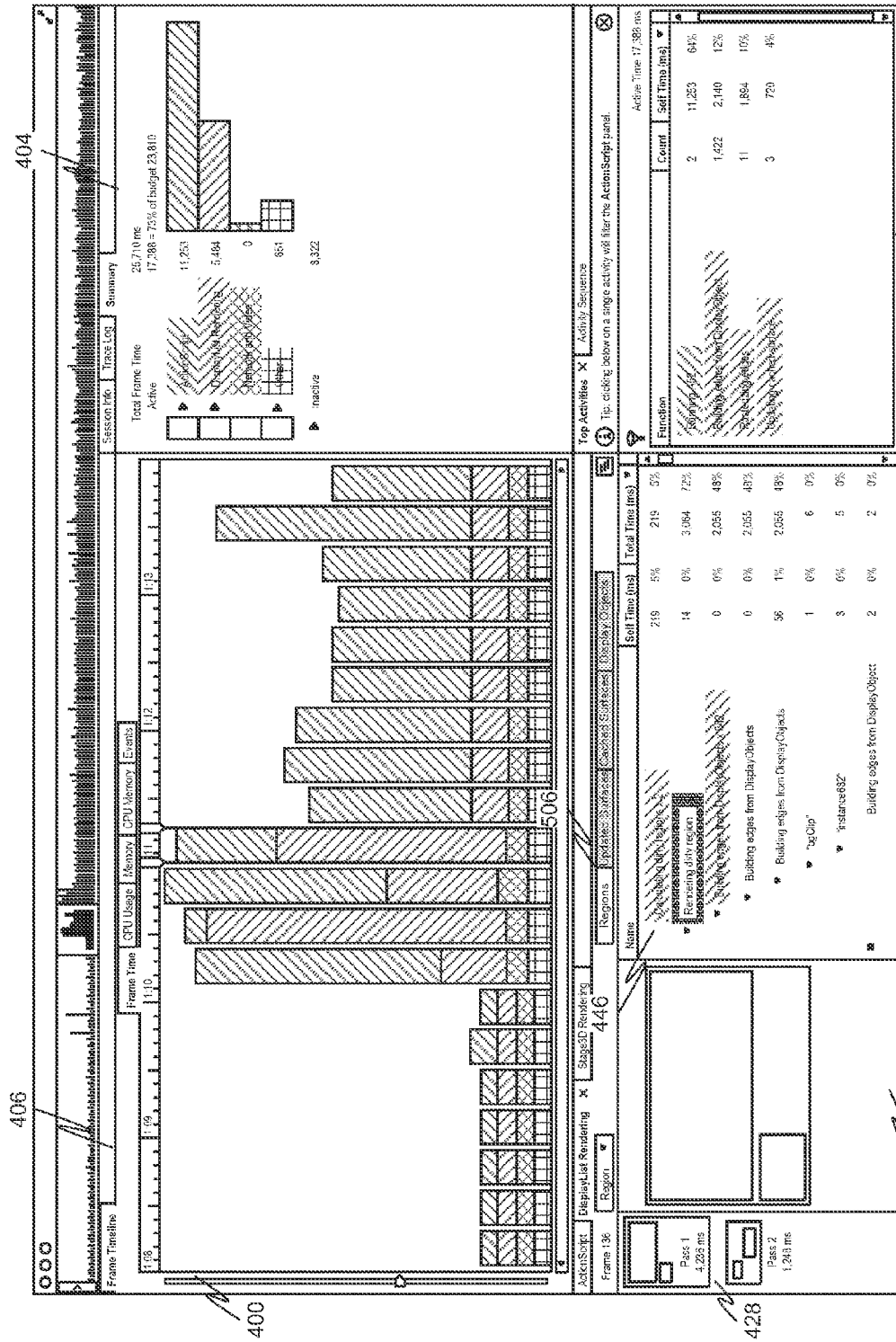
FIG. 6 is a screen capture illustrating the user interface, in accordance with an example embodiment, used to visualize rendering data, at another time.

FIG. 6 is a screen capture illustrating the user interface 400, in accordance with an example embodiment, used to visualize rendering data, at another time. Here, the user has disabled all visual component categories except regions in bar 506. Thus, only visual components of the type regions are depicted in color in the thumbnail portion 428, stage view portion 430, and breakdown tree view 446. Visual components related to other categories are hidden in the thumbnail portion 428 and stage view portion 430, and grayed out in the breakdown tree view 446.

Figure 7:
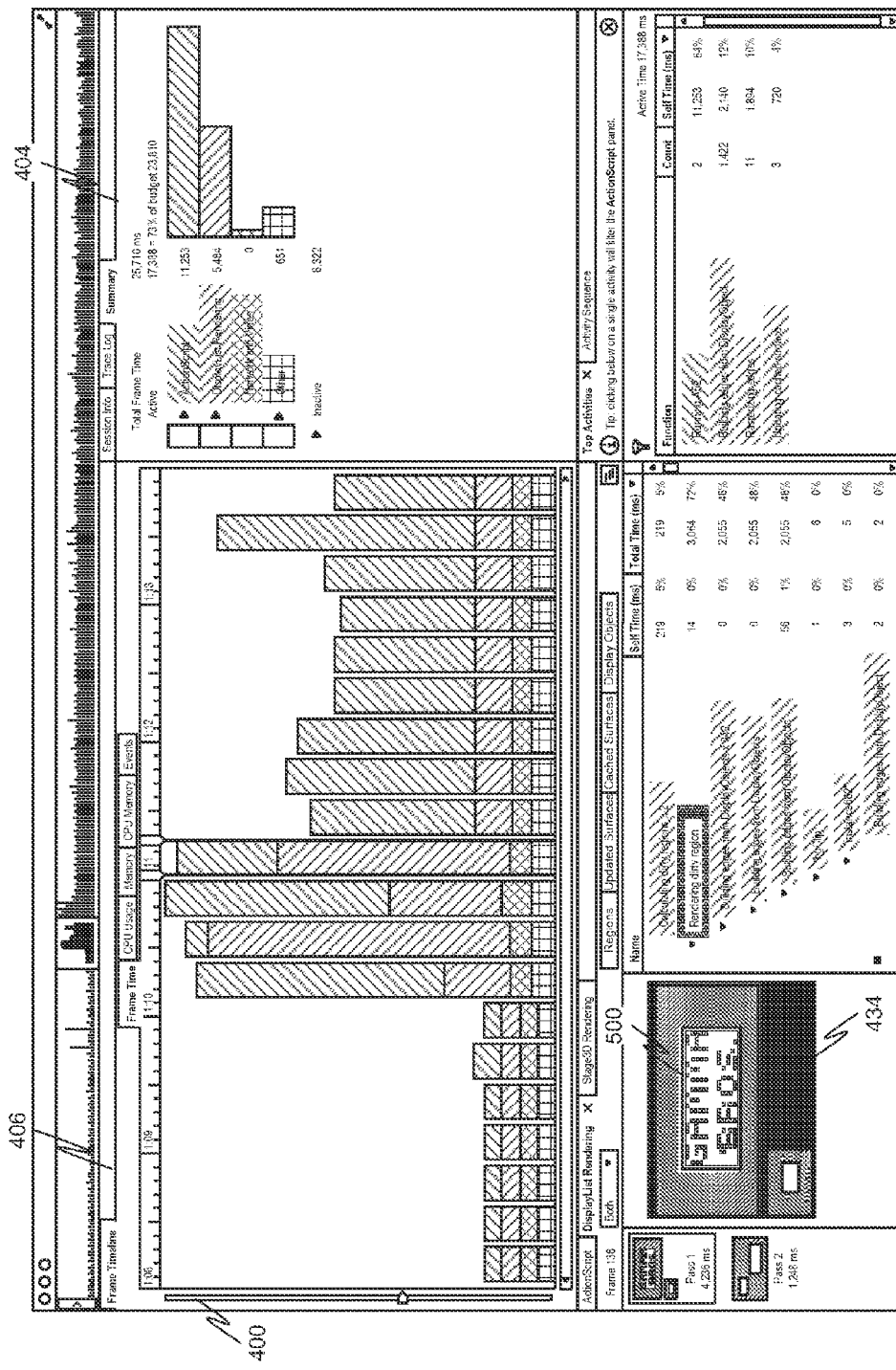
FIG. 7 is a screen capture illustrating the user interface, in accordance with an example embodiment, used to visualize rendering data, at another time.

FIG. 7 is a screen capture illustrating the user interface 400, in accordance with an example embodiment, used to visualize rendering data, at another time Here, the user has selected both from the drop down menu 432 in viewing region 408. This causes the display of both a region view 500 and a heat map 434 overlaid each other in stage view portion 430. This allows users to quickly spot which hot areas correspond to which visual components.

It should be noted that while temporal selection region 416 is depicted in FIGS. 3-9 as not being color-coded, in some example embodiments the temporal selection region 416 can be color-coded in the same way as the other viewing regions 404, 406, 408, 410, 412.

Figure 8:
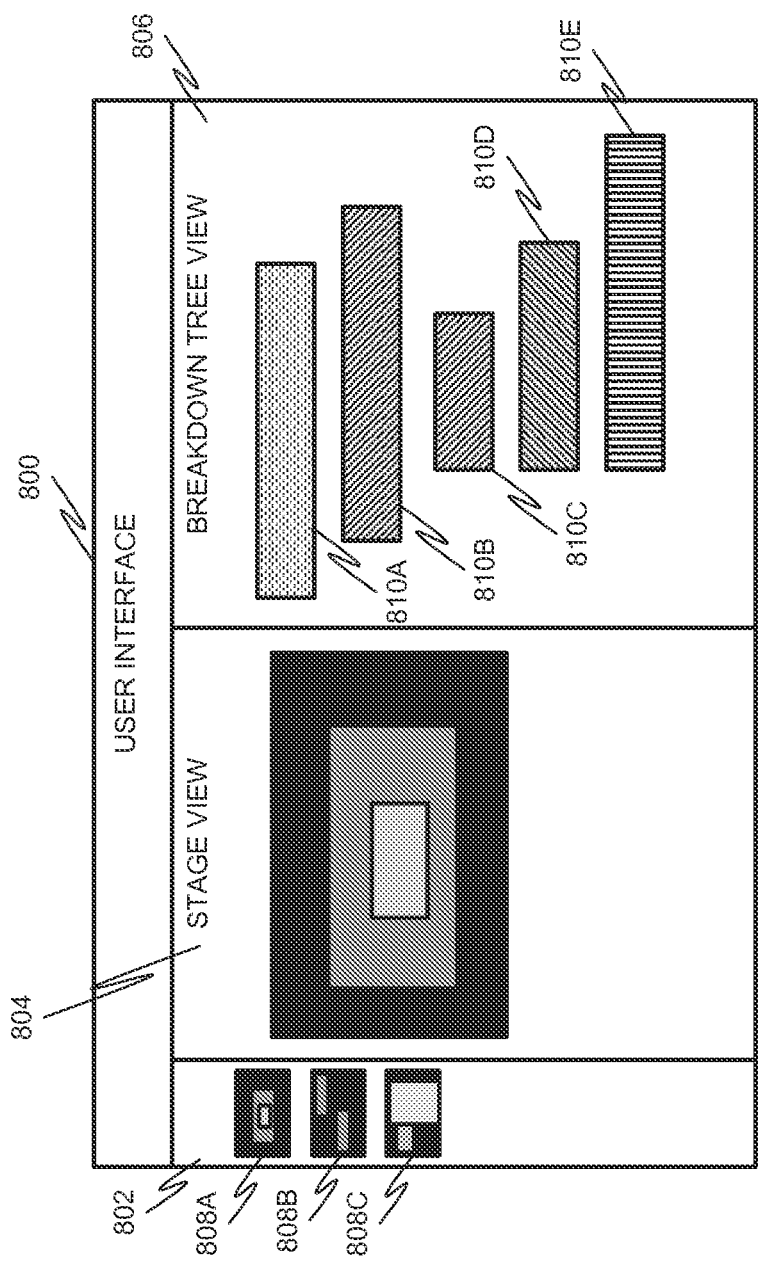
FIG. 8 is a diagram illustrating a user interface, in accordance with an example embodiment, for visually depicting rendering data.

FIG. 8 is a diagram illustrating a user interface 800, in accordance with an example embodiment, for visually depicting rendering data. Here, the user interface 800 contains a thumbnail view 802, a stage view 804, and a breakdown tree view 806, The thumbnail view 802 contains one or more thumbnails 808A, 808B, 808C which can be selected by a user. Selection of one of the thumbnails, here thumbnail 808a, causes stage view 804 to update. Stage view 804 depicts a heat map of the rendering data for a selected frame and rendering pass corresponding to the selected thumbnail 808A. Simultaneously, a breakdown tree view 806 is depicted, showing nested rendering functions 810A, 810B, 810C, 810C, 810D, 810E, some of which can be associated with a rectangle drawn on the stage view 804.

Figure 9:
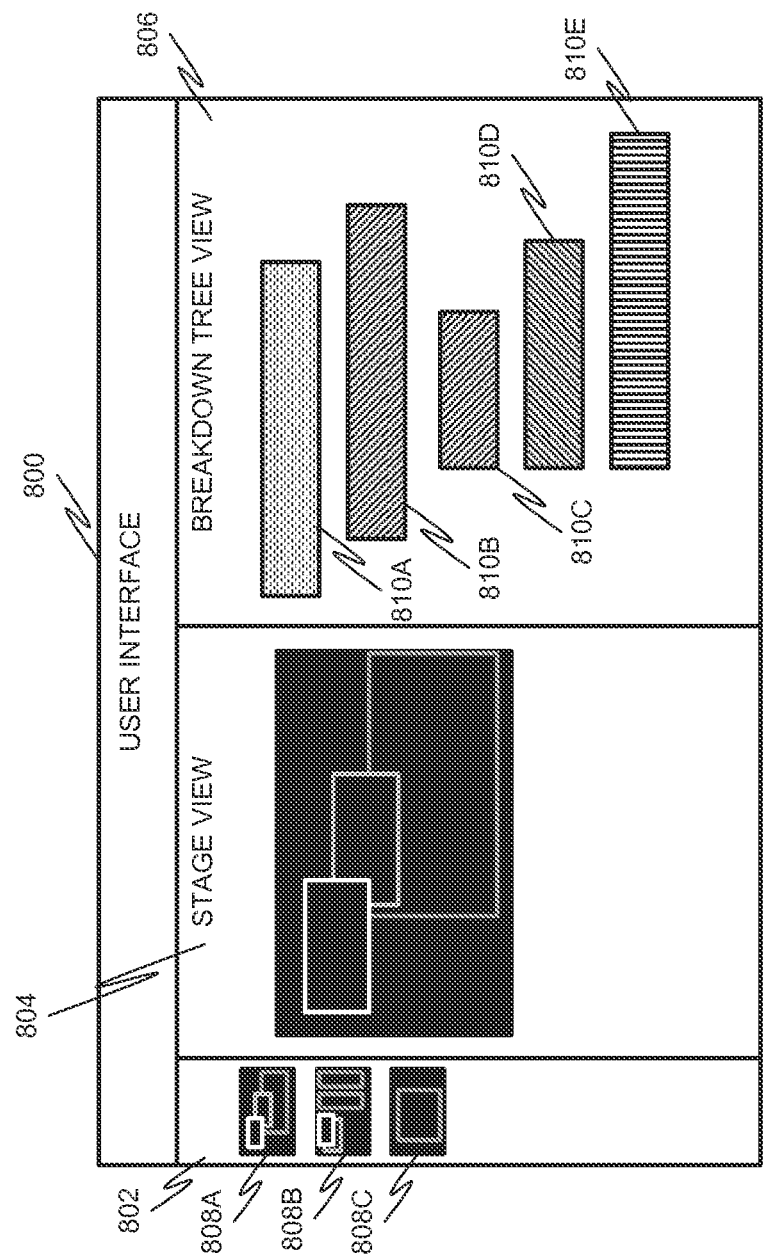
FIG. 9 is a diagram illustrating a user interface, in accordance with an example embodiment, for visually depicting rendering data at another time.

FIG. 9 is a diagram illustrating a user interface 800, in accordance with an example embodiment, for visually depicting rendering data at another time. Here, the user has selected to see a region view, which replaces a heat map in the stage view 804 with a region view for the selected frame and rendering pass.

Figure 10:
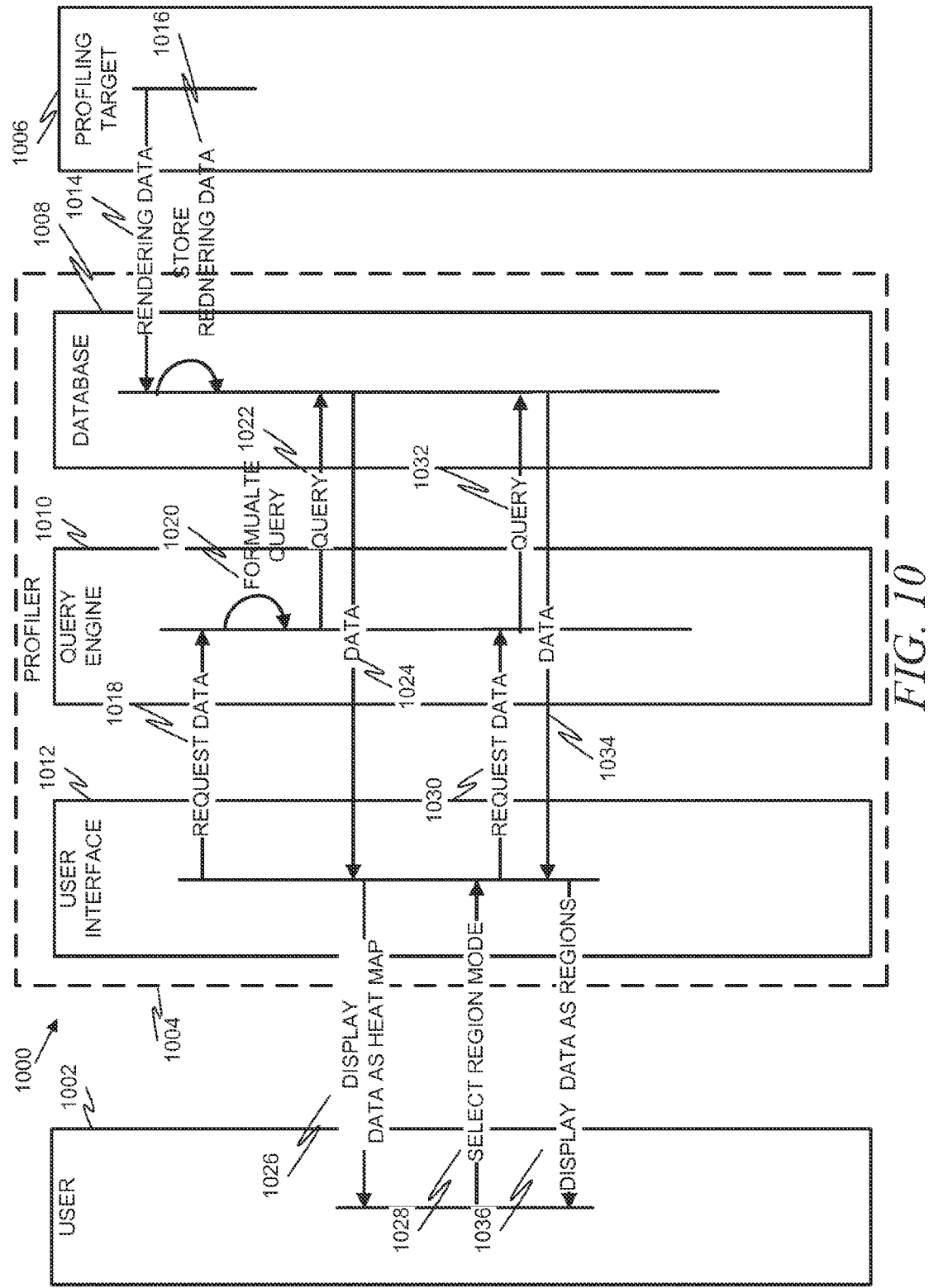
FIG. 10 is an interaction diagram illustrating a method, in accordance with an example embodiment, of visually depicting rendering data.

FIG. 10 is an interaction diagram illustrating a method 1000, in accordance with an example embodiment, of visually depicting rendering data. This method 1000 may include a user 1002 interacting with a profiler 1004, which interacts with a profiling target 1006. The profiler 1004 may comprise a database 1008, a query engine 1010, and a user interface 1012. The database 1008 may receive rendering data from the profiling target 1004 at operation 1014. At operation 1016, the database 1008 may store the rendering data. At operation 1018, the user interface 1012 may send a request for data to the query engine 1010, which formulates a query at operation 1020 and sends this query to the database 1008 at operation 1022. At operation 1024 the database 1108 returns data to the user interface 1012.

At operation 1026, the user interface 1012 displays the data as a heat map. At operation 1028, the user interface 1012 may receive user interaction that selects a region mode. At operation 1030, the user interface 1012 may send a request to the query engine 1010 for data related to the regions needed to be displayed. At operation 1032, the query engine 1010 formulates a query for this additional data, which is returned at operation 1034. At operation 1036, the user interface 1012 displays the data as regions.

Figure 11:
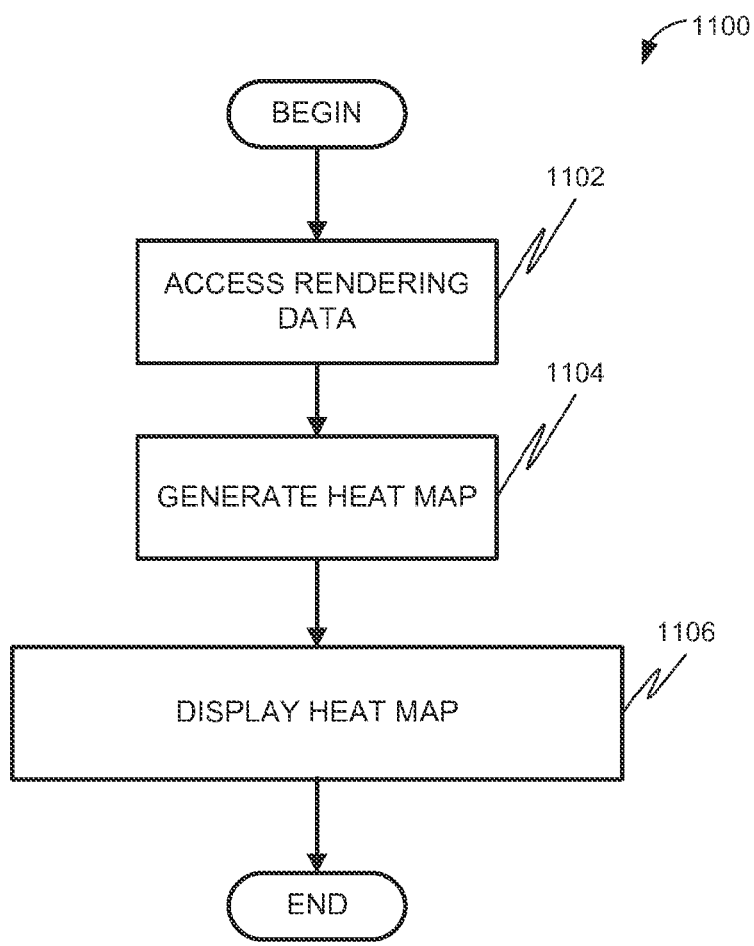
FIG. 11 is a flow diagram illustrating a method, in accordance with an example embodiment, of visually depicting rendering data.

FIG. 11 is a flow diagram illustrating a method 1100, in accordance with an example embodiment, of visually depicting rendering data. At 1102, rendering data pertaining to rendering, by a display engine, of display objects in a display zone for a selected frame is accessed. At 1104, for the selected frame, a heat map is generated based on rendering data corresponding to the selected frame, the heat map containing a plurality of heat objects, each heat object corresponding in proportional size and location to a different display object in the display zone, each heat object displayed in a color having an intensity proportional to an amount of computational resources taken by the display engine to render the corresponding display object. At 1106, the heat map is displayed.

Figure 12:
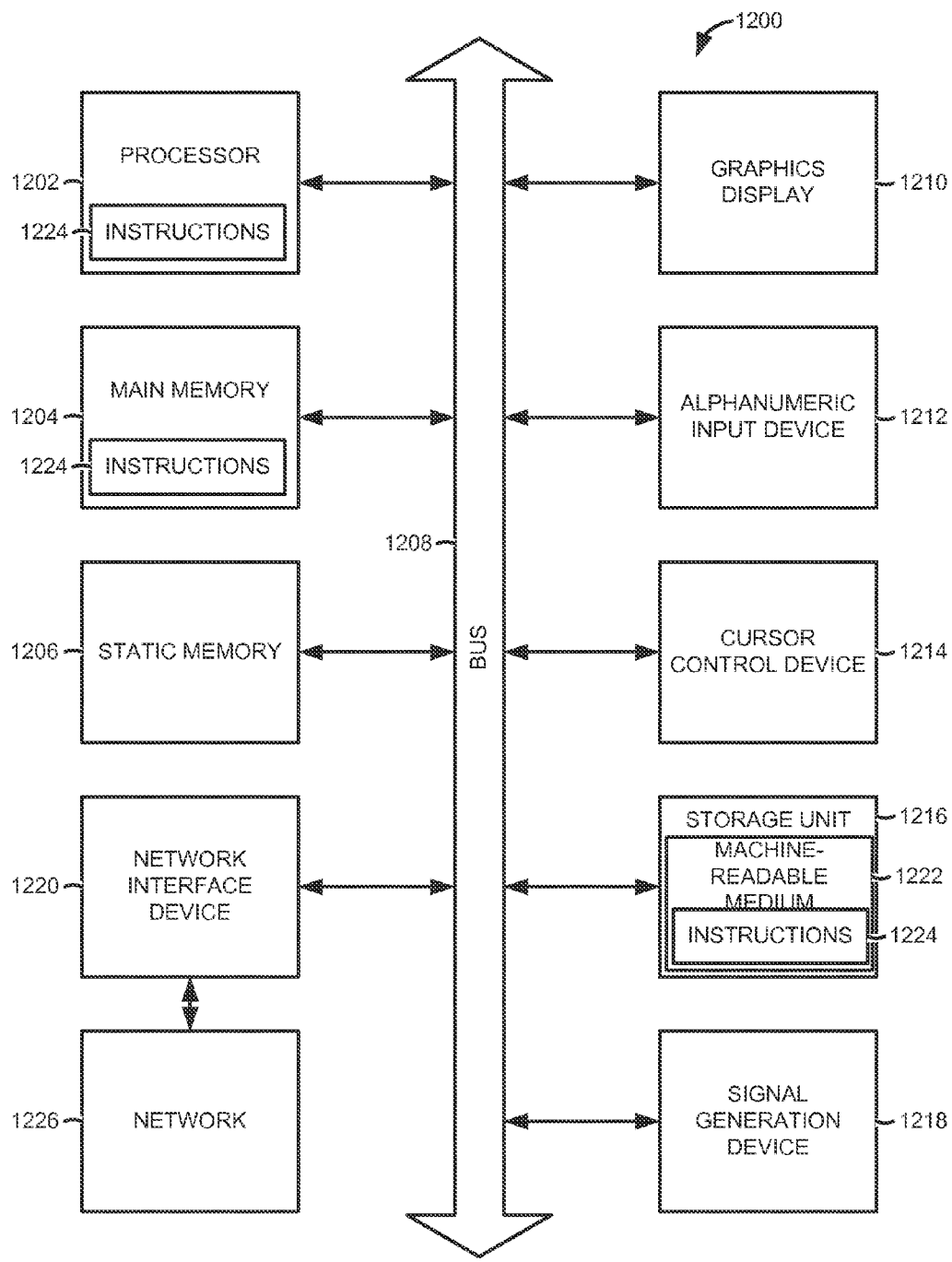
FIG. 12 is a block diagram of a computer processing system at a server system, within which a set of instructions may be executed for causing the computer to perform any one or more of the methodologies discussed herein.

FIG. 12 is a block diagram of a computer processing system 1200 at a server system, within which a set of instructions may be executed for causing the computer to perform any one or more of the methodologies discussed herein.

Embodiments may also, for example, be deployed by Software-as-a-Service (SaaS), application service provider (ASP), or utility computing providers, in addition to being sold or licensed via traditional channels. The computer may be a server computer, a personal computer (PC), a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1200 includes processor 1202 (e.g., a central processing unit (CPU), a graphics processing unit (GPU) or both), main memory 1204 and static memory 1206, which communicate with each other via bus 1208. The processing system 1200 may further include graphics display unit 1210 (e.g., a plasma display, a liquid crystal display (LCD) or a cathode ray tube (CRT)). The processing system 1200 also includes alphanumeric input device 1212 (e.g., a keyboard), a cursor control device 1214 (e.g., a mouse, touch screen, or the like), a storage unit 1216, a signal generation device 1218 (e.g., a speaker), and a network interface device 1220.

The storage unit 1218 includes machine-readable medium 1222 on which is stored one or more sets of instructions 1224 and data structures (e.g., software) embodying or utilized by any one or more of the methodologies or functions described herein. The instructions 1224 may also reside, completely or at least partially, within the main memory 1204 and/or within the processor 1202 during execution thereof by the processing system 1200, the main memory 1204 and the processor 1202 also constituting machine-readable, tangible media.

The instructions 1224 may further be transmitted or received over network 1226 via a network interface device 1220 utilizing any one of a number of well-known transfer protocols (e.g., HTTP).

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions 1224. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fail within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

What is claimed is:

1. A computerized method of visually depicting rendering data, the method comprising: accessing a collection of rendering data corresponding to a rendering of a plurality of display objects in a particular frame of a multimedia file, the collection of rendering data including a plurality of pieces of rendering data that each references an amount of computational resources utilized to render one of the plurality of display objects in the particular frame, wherein the selected set of frames corresponds to telemetry data recorded during a multimedia file examining session, and wherein the multimedia file examining session is based on user-defined starting and ending points that each corresponds to at least the portion of the multimedia file, wherein the particular frame is selected from a frame timeline that graphically depicts at least a portion of rendering data corresponding to each frame of a set of frames selected from the multimedia file; generating a heat map based on the accessed collection of rendering data, the heat map including a plurality of heat objects that each corresponds in proportional size and location to one of the plurality of display objects in the particular frame; and displaying the heat map including the plurality of heat objects, each heat object being displayed in a color having an intensity corresponding to the amount of computational resources utilized to render the corresponding one of the plurality of display objects in the particular frame.

2. The method of claim 1, wherein the intensity further corresponds to an amount of time utilized to render the corresponding one of the plurality of display objects in the particular frame.

3. The method of claim 1, wherein the computational resources are the amount of memory utilized to render the corresponding object.

4. The method of claim 1, further comprising:
displaying a thumbnail image corresponding to each rendering pass of the particular frame, the thumbnail image depicting a smaller version of the heat map for its corresponding rendering pass.

5. The method of claim 1, further comprising:
displaying a hierarchical list of rendering functions as a tree in a breakdown tree view, the tree displaying a plurality of levels of the hierarchical list of rendering functions, the hierarchical list corresponding to rendering functions performed in the particular frame.

6. The method of claim 5, further comprising receiving user interaction with the heat map in the form of a selection of a rendered rectangle and modifying the hierarchical list based on the user interaction by highlighting associated elements in the hierarchical list.

7. The method of claim 5, further comprising receiving user interaction with the hierarchical list and modifying the heat map based on the user interaction.

8. The method of claim 1, wherein the heat map is displayed in a stage view and the method further comprises:
upon selection of a region view by a user, modifying the stage view to depict regions, each region corresponding to a visual component rendered, in the rendering data, on a display, each region displayed with a color corresponding to a category of visual component to which a visual component corresponding to the region relates.

9. The method of claim 8, further comprising:
upon selection of both a region view and a heat map view by a user, modifying the stage view to depict both the heat map and the regions, overlaid each other.

10. The method of claim 1, wherein the intensity is high when the amount of computational resources utilized to render the corresponding one of the plurality of display objects in the particular frame is high relative to the amount of computational resources utilized to render a non-corresponding one or more of the plurality of display objects in the particular frame.

11. The method of claim 1, wherein the set of frames is selected from the multimedia file based on user-selected starting and ending points.

12. The method of claim 11, wherein each of the user-selected starting and ending points corresponds to telemetry data recorded during a multimedia file examining session, wherein the multimedia file examining session corresponds to at least a portion of the multimedia file.

13. The method of claim 1, wherein the graphically depicted portion of rendering data corresponding to each frame from the selected set of frames is based on at least one user-selected data measurement that includes a frame time, CPU, memory, GPU memory, and events.

14. An apparatus comprising:
a processor;
a database storing a collection of rendering data, the collection of rendering data including a plurality of pieces of rendering data that each references an amount of computational resources taken by a display engine to render one of a plurality of display objects in each frame of a set of frames selected from at least a portion of a multimedia file, wherein the selected set of frames corresponds to telemetry data recorded during a multimedia file examining session, and wherein the multimedia file examining session is based on user-defined starting and ending points that each corresponds to at least the portion of the multimedia file; and a user interface configured to:

receive a selection that corresponds to a particular frame from the selected set of frames, wherein the particular frame is selected from a frame timeline that graphically depicts at least a portion of rendering data corresponding to each frame from the selected set of frames, access corresponding pieces of rendering data from the collection of rendering data corresponding to rendering, by the display engine, the plurality of display objects in the particular frame of the multimedia file, for the particular frame, generate a heat map based on the accessed corresponding pieces of rendering data, the heat map including a plurality of heat objects, each heat object corresponding in proportional size and location to one of the plurality of display objects in the particular frame; and display the heat map including the plurality of heat objects, each heat object being displayed in a color having an intensity corresponding to the amount of computational resources taken by the display engine to render the corresponding one of the plurality of display objects in the particular frame.

15. The apparatus of claim 14, the user interface being located in a user interface layer written in a lightweight multi-paradigm programming language designed as a scripting language having extensible semantics.

16. A non-transitory machine-readable storage medium comprising a set of instructions which, when executed by a processor, causes execution of operations comprising: accessing a collection of rendering data corresponding to a rendering of a plurality of display objects in a particular frame of a multimedia file, the collection of rendering data including a plurality of pieces of rendering data that each references an amount of computational resources utilized to render one of the plurality of display objects in the particular frame of the multimedia file, wherein the selected set of frames corresponds to telemetry data recorded during a multimedia file examining session, and wherein the multimedia file examining session is based on user-defined starting and ending points that each corresponds to at least the portion of the multimedia file, wherein the particular frame is selected from a frame timeline that graphically depicts at least a portion of rendering data corresponding to each frame from a set of frames selected from the multimedia file; generating a heat map based on the accessed collection of rendering data, the heat map including a plurality of heat objects, each heat object corresponding in proportional size and location to one of the plurality of display objects in the particular frame; and displaying the heat map including the plurality of heat objects, each heat object being displayed in a color having an intensity corresponding to the amount of computational resources utilized to render the corresponding one of the plurality of display objects in the particular frame.

17. The non-transitory machine-readable storage medium of claim 16 further comprising:

displaying a thumbnail image corresponding to each rendering pass of the particular frame, the thumbnail image depicting a smaller version of the heat map for its corresponding rendering pass.

18. The non-transitory machine-readable storage medium of claim 16 further comprising:

displaying a hierarchical list of rendering functions as a tree in a breakdown tree view, the tree displaying a plurality of levels of the hierarchical list of rendering functions, the hierarchical list corresponding to rendering functions performed in the particular frame.

19. The non-transitory machine-readable storage medium of claim 18, further comprising receiving user interaction with at least one of the heat map and the hierarchical list, and modifying at least one of the heat map and the hierarchical list based on the user interaction.

20. The non-transitory machine-readable storage medium of claim 16, wherein the intensity increases as the amount of time utilized to render the corresponding one of the plurality of display objects in the particular frame increases.

* * * * *